United States Patent [19]

Guzman et al.

[11] 4,286,181
[45] Aug. 25, 1981

[54] STEPPING MOTOR FOR ROTARY DEVICE

[75] Inventors: Adolfo M. Guzman; Howard E. Van Winkle, both of Boulder, Colo.

[73] Assignee: International Business Machines Corporation, Armonk, N.Y.

[21] Appl. No.: 56,770

[22] Filed: Jul. 12, 1979

[51] Int. Cl.³ .............................................. H02K 37/00
[52] U.S. Cl. .................................. 310/49 R; 318/115; 310/191; 310/209
[58] Field of Search ................. 310/49, 190, 191, 192, 310/209; 318/115, 429

[56] References Cited

U.S. PATENT DOCUMENTS

| | | | |
|---|---|---|---|
| 3,869,625 | 3/1975 | Sawyer | 318/115 X |
| 3,881,139 | 4/1975 | Inaba et al. | 318/115 X |
| 4,027,229 | 5/1977 | Frink | 310/190 X |
| 4,110,649 | 8/1978 | Mas | 310/191 |

OTHER PUBLICATIONS

IBM Tech. Disclosure Bulletin, vol. 16, No. 2, 7/73, "Linear-Rotary Actuator and Transducer for Stick Printer", Meier.

Primary Examiner—Donovan F. Duggan
Attorney, Agent, or Firm—Herbert F. Somermeyer

[57] ABSTRACT

A stepping motor mechanism for a rotary device in which one member is indexed linearly and/or rotationally relative to a second rotating member. The indexing member includes at least one portion with a series of equi-distantly spaced ridges and the rotating member includes at least three ferromagnetic members adapted to rotate with the rotating member and spaced from one another, each of the ferromagnetic portions having defined thereon ridges complementary to the ridges on the indexing member but angularly or linearly displaced from one another. A fixed coil and coil carrier is positioned spaced from but adjacent to the ferromagnetic members such that as current is applied to the coils, a magnetic field is induced in the coil carrier and adjacent rotating ferromagnetic member thereby causing the ridges on the adjacent ferromagnetic member to align with the ridges defined on the rotating member.

8 Claims, 8 Drawing Figures

STEPPING MOTOR FOR ROTARY DEVICE

This invention relates to a stepping motor mechanism for a rotary device, and more specifically to a stepping motor device in which both the member being indexed and the member relative to which the indexing member moves are rotated.

BACKGROUND OF THE INVENTION

Stepping motors capable of inducing selected rotary motion and linear motion axially of the rotary motion are well known. Typically, such devices utilize a stator having zoned magnetic field producing means and an armature having portions, usually rings or splines, which may be aligned with the activated magnetic field of the selected zone of the stator. Thus, the armature may be rotated and or displaced axially by, in preferred embodiments, multiphase activation of the stator magnetic zones. U.S. Pat. No. 3,881,139 discloses such motors, as well as useful control systems for multiphase control of the stator magnetic zones. Other related art teachings of such devices include U.S. Pat. Nos. 3,394,295, 3,441,819, 3,453,510 and 3,745,433.

However, conventional stepping motors, such as those described by the above-identified patents, are adaptable to index one rotating member relative to another rotating member only at the expense of substantial rotating mass, i.e. rotation of the nominal stator members with the indexed armative member, with accompanying moving contact between electrical slip rings to provide electrical current to the rotating coils. As a consequence, such stepping motors, though operable in rotary devices to provide rotary and linear indexing between two rotating members, are unduly heavy in subject to wear, arcing, and electrical failure at the slip rings.

SUMMARY OF THE INVENTION

This invention provides a stepping motor uniquely suited to index one rotating member relative to another rotating member either in a rotary manner, a linear manner, or a combination of both. An indexing member, i.e. an armature, is provided with a number of ridge members such as splines or rings, in a manner similar to conventional devices. A number of fixed coils are arranged adjacent the armature, and a rotating magnetic "slip ring" or pole piece, having ridges defined thereon complementary to those defined in the armature are provided to rotate with a second rotating member. Thus, when a selected coil is energized, a magnetic field is induced in the rotating magnetic "slip ring" and the ridges defined thereon align with the ridges defined on the armature to effectively lock the armature relative to the magnetic slip ring. By sequentially energizing selected coils, rotary and/or linear movement may be induced in a manner otherwise similar to that of conventional devices, but without physical or electrical contact between the fixed and rotating members, and with a great savings in rotating weight.

DESCRIPTION OF THE DRAWINGS

The above mentioned and other features of this invention and the manner of obtaining such advantages will become more apparent, and the invention itself will best be understood, by reference to the following description of the embodiments of the invention taken in conjunction with the accompanying drawings, the description of which follows.

DESCRIPTION OF THE PREFERRED EMBODIMENT

Figure 1:
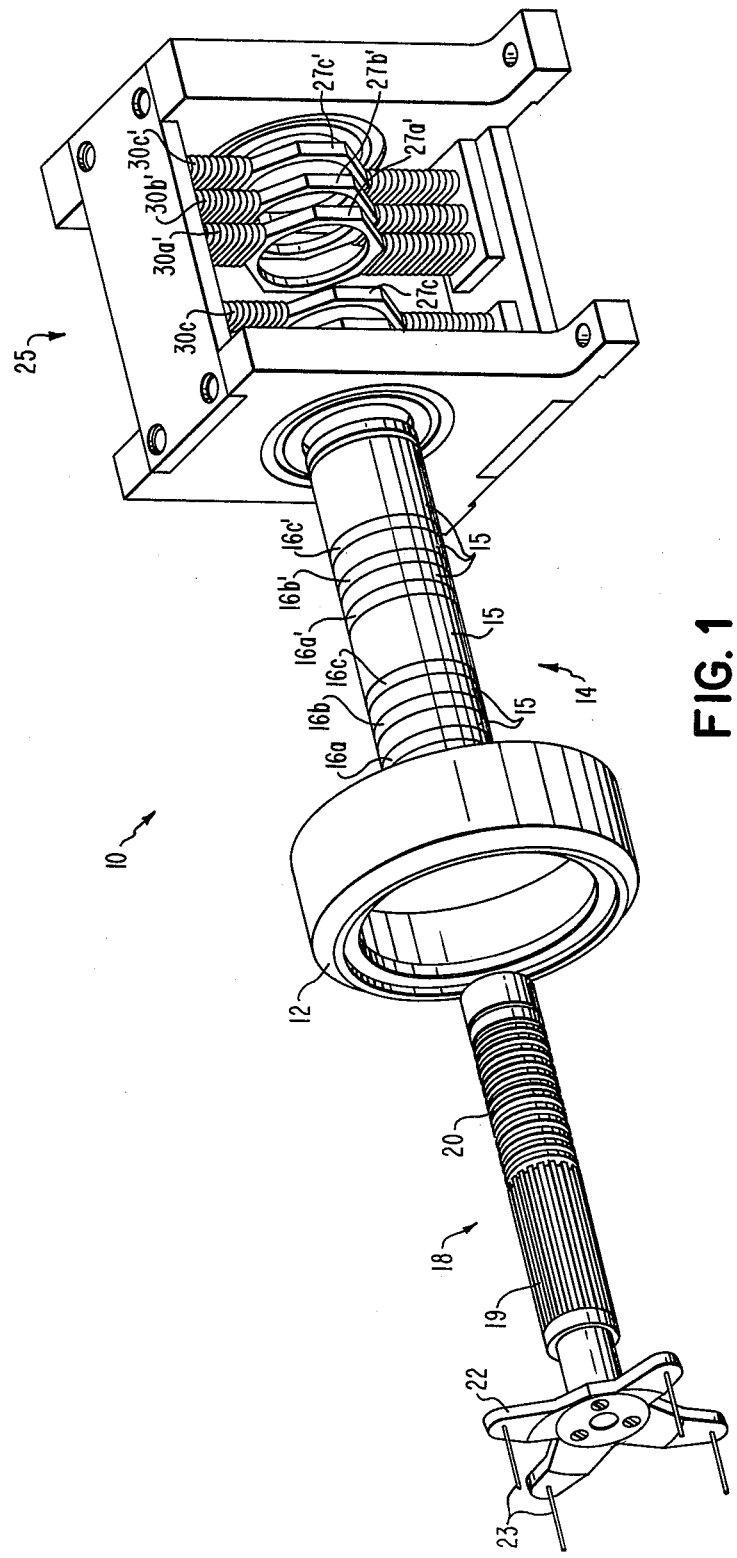
FIG. 1 is an axially exploded view of a stepping motor in accord with the instant invention.

Turning now to the drawings, wherein like components are designated by like reference numerals throughout the various figures, an indexing device for providing rotary and/or linear movement between two rotating members is illustrated in FIG. 1 and generally designated by reference numeral 10. For purposes of illustration, indexing device 10 is described with reference to a mechanism for positioning and opening a pack of flexible disk storage members, but of course could be utilized for providing such indexing movements for many purposes. Thus, as illustrated, indexing device 10 includes head 12 adapted to engage and rotate a pack of memory disks members (not shown). Head 12, which constitutes one rotating member, in this instance a member rotating at constant speed, is carried on magnetic slip ring assembly 14. Magnetic slip ring assembly 14 is formed of spacers 15 of a nonmagnetic material such as brass, which separate magnetic slip rings 16, which are further defined as 16a, 16b and 16c, i.e. as three phase magnetic slip rings for inducing rotary motion, and 16a', 16b', and 16c', again three phase magnetic slip rings for producing linear motion. While described as slip rings, it is to be understood the magnetic slip rings 16 do not contact other components other than spacers 15 and function as rotating pole shoes. Armature 18, which has defined thereon splines 19 for accomplishing rotary movement, and rings 20 for accomplishing linear movement, is rotatable carried within but adjacent to magnetic slip ring assembly 14, as will be more fully described with reference to FIGS. 2 and 3. Indexing head 22 carrying pins 23 thereon, are provided at the end portion of armature 18. While the specific purpose of the indexing motion is not a feature of the instant invention, it should be noted for purposes of illustration that while head 12 rotates at a constant speed, rotary and/or linear movement of pins 23 relative to head 12 is useful to select and engage desired memory elements.

Frame member 25 supports coil carriers 27 which are essentially static field or pole pieces of ferromagnetic material. Coils 30 are wound on coil carriers 27 so as to induce a magnetic flux through coil carrier 27 upon application of current to coils 30. Again coil carriers 27 and coils 30 are designated a, b, c and a', b' and c', to designate three phase operation and differentiate between rotary and axial movement sections.

Figure 2:
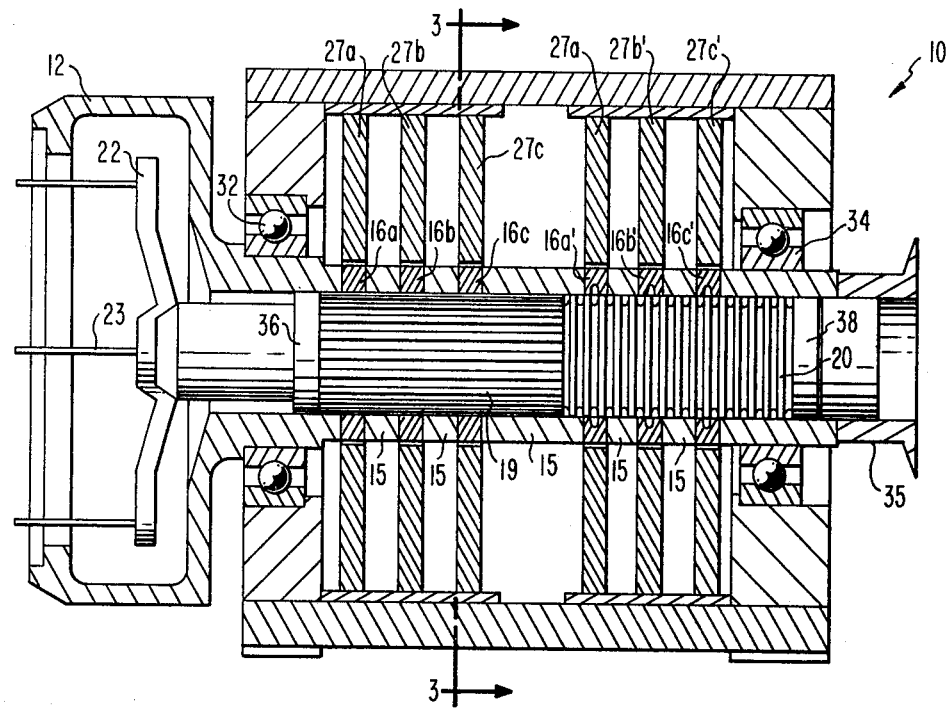
FIG. 2 is a section view of the device illustrated in FIG. 1.
Figure 3:
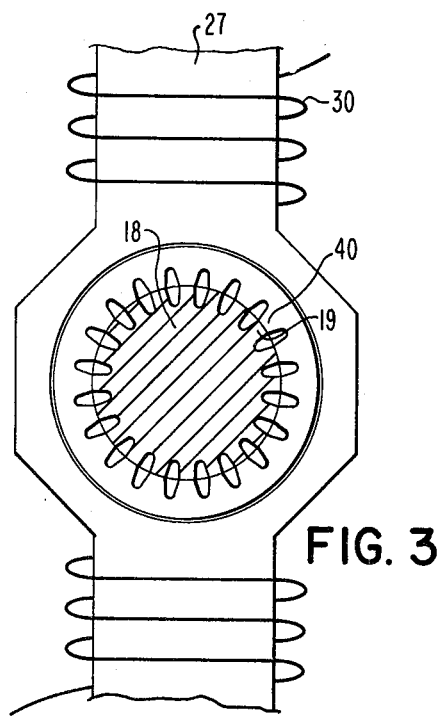
FIG. 3 is a section view along section line 3—3 of the device illustrated in FIG. 2.
Figure 4:
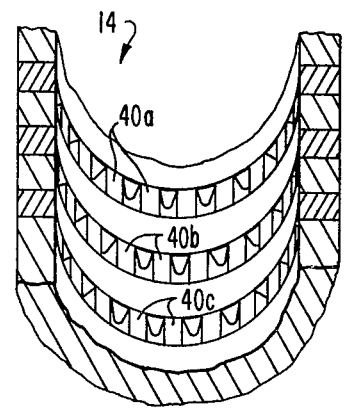
FIG. 4 is a section view in perspective of the "magnetic slip rings" portion of the stepping motor.

The specific relationships of magnetic slip ring assembly 14, armature 18 and frame member 25 would be understood with reference to FIG. 2. As shown therein, front bearing 32 and rear bearing 34 carry magnetic slip ring assembly 14 for rotation in frame member 25. Pulley 35 at the end of magnetic slip ring assembly 14 may be provided for inducing rotation of magnetic slip ring assembly 14 by, for instance, a belt drive (not shown) or other means of rotation may be provided. Front bushing 36 and rear bushing 38 support armature 18 within magnetic slip ring 14 but providing both rotary and axial freedom of movement. The relationship of armature 18, and magnetic slip rings splines 40 defined on the interior of magnetic slip rings 16 will be more readily understood with reference to FIG. 3. As shown, splines 19, on armature 18, and complementary splines 40 on slip rings 16, are configured to permit alignment. Accordingly, when coil 30 is activated magnetic flux is induced in coil carrier 27 and, across the gap to magnetic slip ring 16 thereby causing armature 18 to rotate to align splines 19 thereon with splines 40 defined on magnetic slip rings 16. Selective movement is accomplished, as shown in FIG. 4, by angularly displacing splines 40a, 40b and 40c a selective increment in the direction of movement by sequentially energizing with magnetic flux the appropriate slip ring. Thus, as shown in FIG. 4, a sequential activation of slip rings 40a, 40b, 40c, and 40a will induce a counter-clockwise rotary movement, while a sequential activation of slip rings 40a, 40c, 40b, and 40a will induce a clockwise rotation.

Figure 5A:
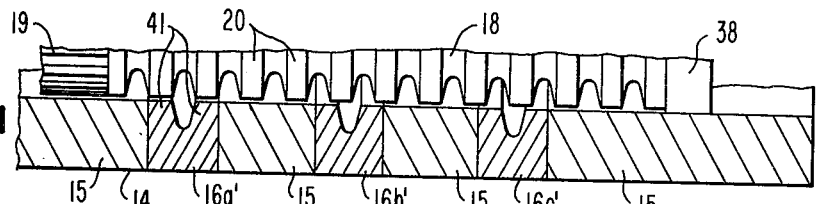
FIGS. 5a, 5b, and 5c are sequential views of the slip ring and armature portion of the stepping motor undergoing an axial displacement.
Figure 5B:
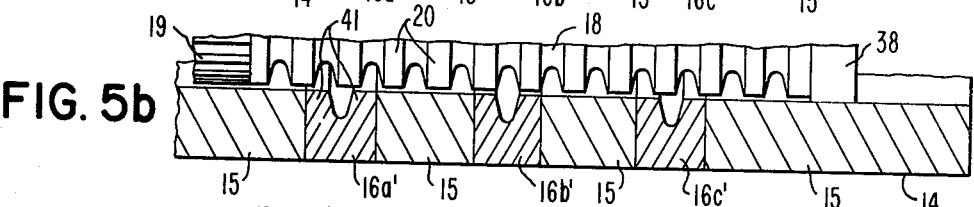
Figure 5C:
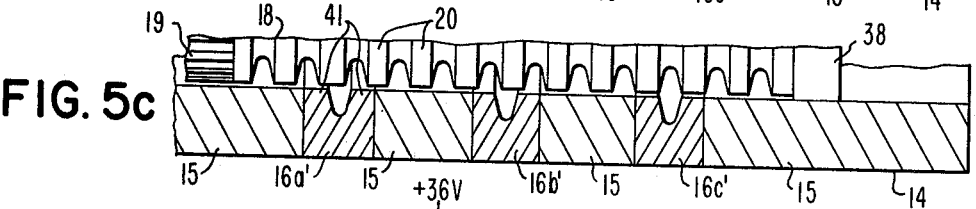

A similar sequence concerning linear motion is illustrated in FIGS. 5a, 5b and 5c. As shown, slip rings 16a', 16b', and 16c' may be selectively and sequentially magnetized. When slip ring 16a' is magnetized as described above, ridges 41 defined thereon induce armature 18 to move to align corresponding to rings 20. When slip ring 16b' is magnetized, as shown in FIG. 5b, armature 18 moves from the position shown in FIG. 5a to that shown in 5b. In the same manner when slip ring 16c' is magnetized, the orientation of armature 18 as shown in FIG. 5c is accomplished. Thus it will be seen that the three phase operation causes armature 18 to move from right to left, i.e. from the position shown FIG. 5a through that of FIG. 5b to that of FIG. 5c. Taking as a reference point FIG. 5c, if further movement of armature 18 to the left is desired, slip ring 16a' would then be activated. If movement of armature 18 to the right is desired slip ring 16b' would then be magnetized. Thus, from the above description it would be appreciated that by selectively and sequentially inducing magnetic flux in coil carriers 27 and accordingly in adjacent slip rings 16, rotary movement of armature 18 relative to slip ring assembly 14 will be accomplished. Similarly, by selective and sequential inducement of magnetic flux in coil carriers 27' and accordingly adjacent slip rings 16', linear or axial movement of armature 18 relative to assembly 14 may be accomplished.

Figure 6:
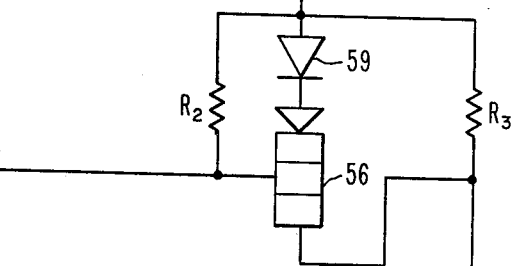
FIG. 6 is a schematic view of a control circuit suitable for activating the stepping motor of the instant invention.
Figure 6:
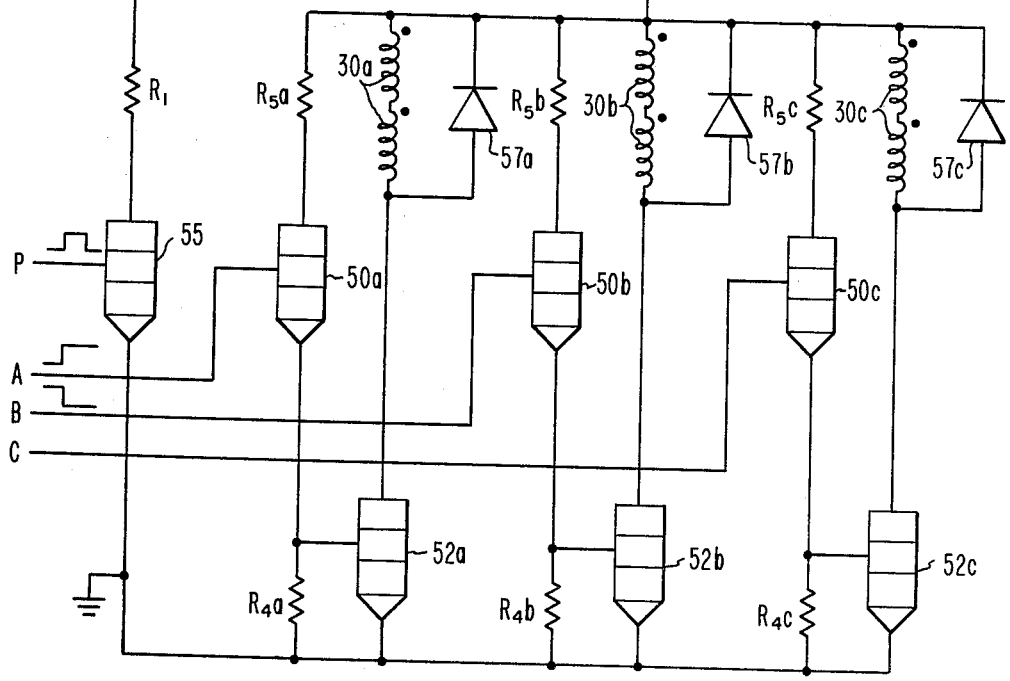

While conventional prior art means for inducing current in coils 30 and accordingly for producing magnetic flux in coil carriers 27, may be utilized a suitable control circuit is illustrated in FIG. 6. As shown, three phase control primarily by means of transistors 50a, 50b and 50c are provided. Thus when phase b terminates, as shown by the "B" input falling waveform, phase a is activated by the "A" input waveform. Thus transistor 50a becomes conductive while transistor 50b is turned off. At the time transistor 50a becomes conductive, current from the 36 volt source, across transistor R3 and R5a is provided to turn on transistor 52a which in turn connects coil 30a to the current source as illustrated. At the same time, a pulse at line P, from, for instance, a one shot pulse generator is provided to momentarily turn on transistor 55. While transistor 55 is turned on, transistor 56 is also conductive thus shunting out resistance R3 and providing the full 36 volts across coil 30a. In this manner, a temporary high current is induced to coil 30a to provide a strong alignment magnetic flux and then upon the termination of the pulse at line P, resistance R3 is again included across the circuit between coil 30a and the 36 volt source thereby providing a lower current flow through coil 30a and a reduced magnetic flux. Diodes 57 and 59 are provided to minimize oscillations in the circuits upon switching and resistors R-1 and R-2 are essentially voltage biasing resistors R-4 and R-5 are voltage biasing resistors for transistors 52 and 50. Resistor R-3 is, as described above, is provided to lower the current supplied to coils 30a, except for the period during which the pulse at line P turns on transistor 55.

Accordingly, it will be understood that the circuit illustrated in FIG. 6, when considered in view of the discussion of FIGS. 1 through 5c, enables an initial strong current to be provided to the electric coil 30 to align the splines 19 and rings 20, as may be the case, on armature 18 with the appropriate ridges on slip rings 16, and thereafter a lesser current is maintained through the appropriate coil 30 to maintain the alignment. Once aligned, slip rings 16 and splines 19 or rings 20 are in an aligned, closely spaced relationship and thus require substantially less maintenance magnetic flux.

In summary, it will be appreciated that the instant invention provides for low rotational mass and no moving physical or electrical contact between magnetic slip ring assembly 14 and either armature 18 or coil carriers 27. Heavy components, such as coil carriers 27 or coils 30 are statically mounted, but highly efficient through magnetic linking at rotating magnetic slip ring 16. Fixed electrical contacts with nonmoving coils 30 provide for reliability and long life, and efficiency is maintained through the effective magnetic bridge between coil carrier 27, magnetic slip ring 16 and armature 18. In this manner, rotary indexing, linear indexing, or both may be readily, effectively and efficiently accomplished between rotating members 12 and 22.

Although only limited embodiments have been illustrated and described, it is anticipated that the various changes and modifications will be apparent to those skilled in the art, and that such changes may be made without departing from the scope of the instant invention as defined by the following claims.

What is claimed is:

1. A stepping motor comprising:
    a frame;
    an axially elongated armature having a plurality of spaced elongated magnetic flux-concentrating ridges extending in a predetermined direction;
    a movably mounted ring assembly on the frame and positioned co-axially adjacent to said armature, but radially spaced therefrom, said ring assembly including a plurality of elongated ring members of magnetic material separated by spacers of nonmagnetic material, the ring members being adjacent and facing said elongated ridges on said armature for magnetic interaction therewith,
    a coil carrier of magnetic material fixedly mounted on said frame adjacent to but radially spaced from and axially aligned with each ring members respectively, and
    an electrical coil mounted on each coil carrier;

whereby magnetic armature step-inducing flux may be supplied via a predetermined coil carrier by conducting current through the coil on the coil carrier thereby supplying a magnetic flux in the respective adjacent ring member, and, in turn, aligning the respective ring members and predetermined ones of said ridges on said armature.

2. A stepping motor as set forth in claim 1 having three sets of ring members, coil carriers and coils, whereby a three phase indexing movement may be accomplished.

3. A stepping motor as set forth in claim 1 in which the spaced elongated flux-concentrating ridges on said armature are axially extending spline members on a first axial portion of said armature, and circumferentially extending ring members on a second axial portion of said armature, whereby the spline members may be utilized to induce rotary movement of the armature relative to the ring assembly, and the ring members may be utilized to induce linear movement relative to the ring assembly.

4. A stepping motor as set forth in claim 3 in which said ring members adjacent said first axial portion of said armature have axially extending and angularly displaced magnetic flux-concentrating ridges facing said armature, and said ring members adjacent the second axial portion of said armature having circumferentially extending and axially displaced magnetic flux concentrating ridges facing said armature.

5. A stepping motor as set forth in claim 4 in which said ring assembly is movably positioned relative to the armature by a pair of bushings interposed between the ring assembly and the armature whereby the ring assembly and armature are free to move axially and rotationally relative to one another.

6. A stepping motor as set forth in claim 1 in which the ring assembly is movably positioned relative to the armature by a pair of bushings interposed between the ring assembly and the armature whereby the ring assembly and armature are free to move axially and rotationally relative to one another.

7. A stepping motor comprising:
a frame member;
a plurality of coil carriers mounted to the frame member;
a plurality of coils carried on the coil carriers;
a cylindrical ring assembly adapted to be rotated relative to the frame member and formed of magnetic material, said rings being axially adjacent the coil carriers and non-magnetic rings having interior ridges therein with the interior ridges being non-aligned between the rings;
an armature mounted co-axially within the magnetic ring assembly and having ridges complementary to the ridges defined in the ring members defined thereon with one portion having such ridges defined in the form of equi-distantly spaced, axially extending splines, and another portion of the armature having such ridges formed as circumferentially extending equi-distantly spaced rings; and
means to sequentially and selectively induce magnetic flux in individual coil carriers and accordingly in adjacent magnetic rings and the armature adjacent such rings whereby the armature may be indexed relative to the rings.

8. A stepping motor, comprising:
a frame;
an armature moveably mounted on said frame and having a magnetic path means with a plurality of flux directing ridge means facing said frame,
a magnetic ring means for transferring magnetic flux, and movably disposed between said armature means and said frame and having a plurality of spaced apart rings facing said armature means and alignable with said flux directing means into a constant flux transferring relationship, and
circumferentially extending magnetic path means axially aligned with said ring means for transferring magnetic flux thereto for magnetically energizing said armature via said magnetic ring means during movements thereof with respect to said frame.

* * * * *